(12) United States Patent
Fay et al.

(10) Patent No.: US 7,756,185 B1
(45) Date of Patent: Jul. 13, 2010

(54) HARDENED PUMP LASER AND METHOD OF MAKING THE SAME

(75) Inventors: Josiah W. Fay, Highland Park, NJ (US); Joseph Leone, Oak Ridge, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 296 days.

(21) Appl. No.: 11/998,979

(22) Filed: Oct. 31, 2007

(51) Int. Cl.
*H01S 3/09* (2006.01)
(52) U.S. Cl. .............................. 372/90; 372/55; 372/57
(58) Field of Classification Search .................. 372/90, 372/55
See application file for complete search history.

(56) References Cited

U.S. PATENT DOCUMENTS

| 3,711,790 | A | * | 1/1973 | Gans ........................... 372/67 |
| 5,369,660 | A | * | 11/1994 | Schlie et al. .................. 372/55 |
| 6,834,069 | B1 | * | 12/2004 | Bergmann et al. ............ 372/57 |

* cited by examiner

*Primary Examiner*—Dung T Nguyen
(74) *Attorney, Agent, or Firm*—Michael C. Sachs

(57) ABSTRACT

A hardened pump laser comprises a hardened pump chamber that combines the functions of a conventional flash lamp and a conventional laser cavity flow tube. The hardened pump chamber comprises a hardened filter tube and electrodes. The electrodes are sealed to the hardened filter tube. A chamber in the hardened filter tube is filled with gas through the electrodes, then sealed. The hardened pump chamber performs the laser pumping function while further performing filtering and diffusion functions.

1 Claim, 6 Drawing Sheets

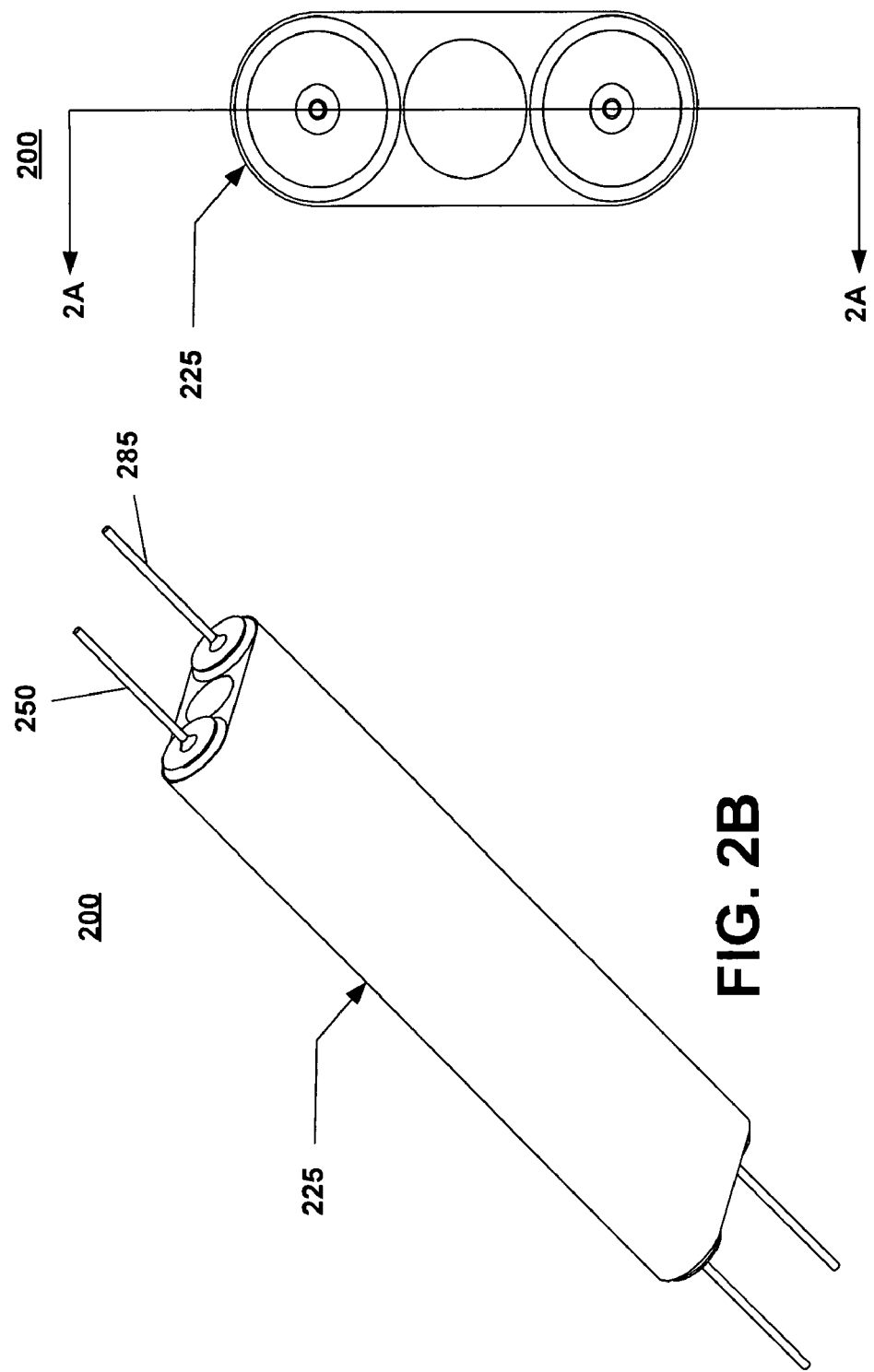

HARDENED PUMP LASER AND METHOD OF MAKING THE SAME

U.S. GOVERNMENTAL INTEREST

The inventions described herein may be manufactured, used and licensed by or for the U.S. Government for U.S. Government purposes.

FIELD OF THE INVENTION

The present invention generally relates to solid-state laser systems. In particular, the present invention relates to a pump chamber for a hardened pump laser system and more specifically to a pump chamber hardened to withstand a high shock and acceleration environment.

BACKGROUND OF THE INVENTION

Laser ignition was developed by the U.S. government. One of the goals of laser ignition has been to increase the ability of the laser igniter to reliably ignite the propelling charge and increase safety. To date, these systems typically comprise a solid-state flash lamp pumped laser system.

FIG. 1 illustrates a cross-sectional diagram of a traditional solid-state flash lamp pumped laser 100 comprising an active medium, a pumping scheme, and a resonator. The active medium (i.e., a solid state laser rod 105) is the material that, when excited, amplifies light and generates a laser beam. The pumping scheme comprises pump chambers 120, 130. The pump chamber 110 comprises a flash lamp 120 and a laser cavity flow tube 125. The pump chamber 115 comprises a flash lamp 130 and a laser cavity flow tube 135.

The flash lamps 120, 130, excite the solid-state laser rod 105, causing the solid-state laser rod 105 to lase. The resonator comprises two mirrors, one on either end of the solid-state laser rod 105, one of which is partially reflective. The resonator allows the laser beam to pass back and forth through the solid-state laser rod 105, amplifying the laser beam.

The laser cavity flow tube 125 surrounds the flash lamp 120 in a dimension radial to the flash lamp 120. Similarly, the laser cavity flow tube 135 surrounds the flash lamp 130 in a dimension radial to the flash lamp 130. The laser cavity flow tubes 125, 135, filter out undesirable ultraviolet and infrared light emitted by the flash lamps 120, 130. The laser cavity flow tubes 125, 135, further attenuate to a desired level the light energy applied to the solid-state laser rod 105. Flash lamp leads 140, 145, 150, 155, connect the flash lamps 120, 130, to a power supply.

However, due to the fragile nature of the solid-state flash lamp pumped laser system, breech mounted laser ignition systems are typically limited to environments with minimal shock and acceleration. Hardening a breech mounted laser ignition system to high shock and acceleration environments would allow the use of laser ignition for weaponry such as a 155 mm howitzer artillery weapon system, which has high shock, vibration, and acceleration due to recoil. The most fragile portions of the solid-state flash lamp pumped laser system are the flash lamps 120, 130, which are typically quartz flash lamps. Hardening the pump chamber would extend the applicability of laser ignition to the high shock and acceleration environment of a 155 mm howitzer artillery weapon system.

Thus, there is need for a hardened pump laser and method of manufacturing the same. The need for such a system has heretofore remained unsatisfied.

SUMMARY OF THE INVENTION

The present invention satisfies this need, and presents a system and an associated method (collectively referred to herein as "the system" or "the present system") for a hardened pump laser and method of manufacturing the same.

The present system comprises a hardened pump chamber that comprises a hardened filter tube and electrodes. The electrodes are sealed to the hardened filter tube. A chamber in the hardened filter tube is filled with gas through the electrodes, and is then sealed. The hardened pump chamber performs the laser pumping function of the conventional flash lamp while further performing the filtering and diffusion functions of the conventional laser cavity flow tube.

Compared to a conventional solid-state flash lamp pumped laser, the present system increases survivability for high shock and acceleration environments, reduces parts count, decreases overall size, and improves laser efficiency. Compared to a conventional solid state flash lamp pumped laser of similar output power, the present invention is approximately 25% smaller, consumes approximately 50-75% less power, and is approximately 50-75% more efficient.

Furthermore, conventional solid state flash lamp pumped lasers require significant shock and vibration isolation to survive the high shock and acceleration environments of typical military applications. The present invention requires minimal or no shock and vibration isolation. The present invention can be used in any application that requires high output power in a small robust package such as, for example, laser range finders, dental and optical laser systems, laser welders, and laser cutting machines.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 comprises FIGS. 2A, 2B, and 2C, wherein FIG. 2B is a perspective view of the hardened pump laser of FIG. 2A; and FIG. 2C is a rear view of the hardened pump laser of FIGS. 2A and 2B;

DETAILED DESCRIPTION OF PREFERRED EMBODIMENTS

The following definition and explanation provide background information pertaining to the technical field of the present invention, and are intended to facilitate the understanding of the present invention without limiting its scope:

Harden: to produce in a fashion capable of withstanding rough usage or extreme environments such as high shock, acceleration, or vibration.

Figure 2A:
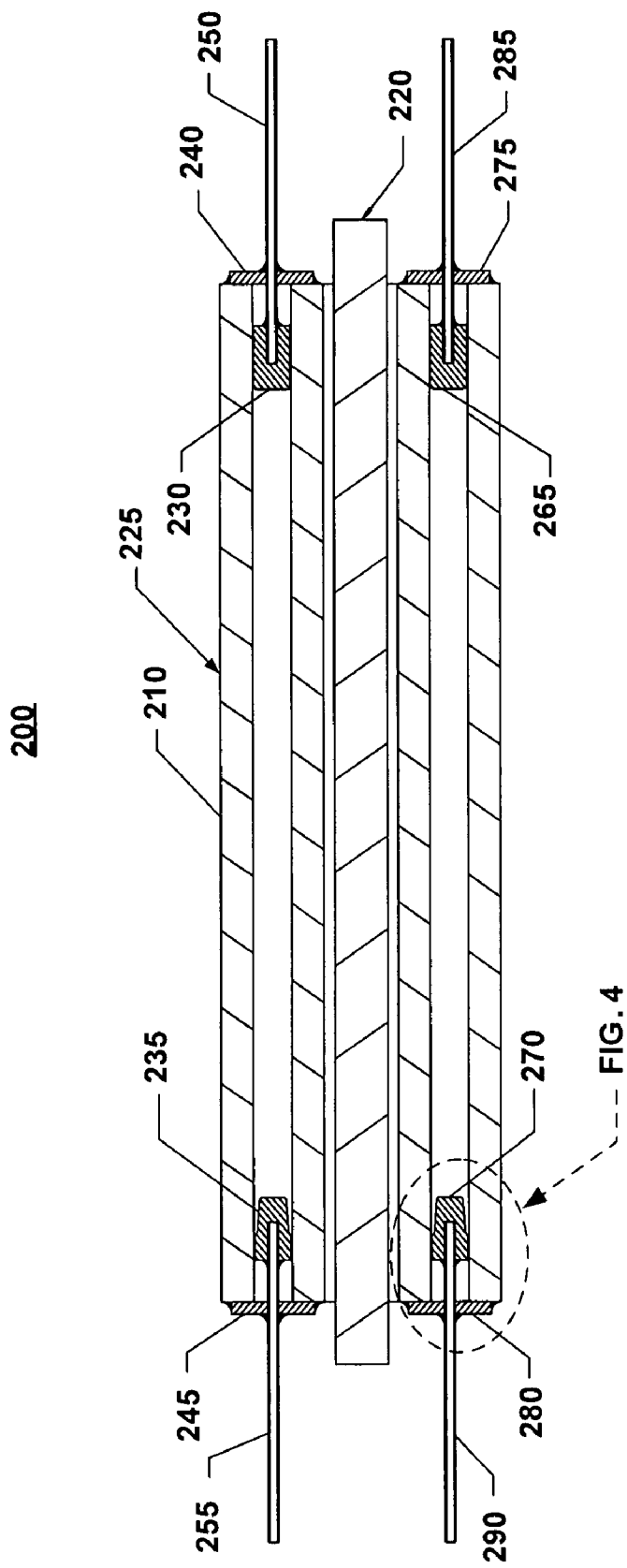
FIG. 2A is a cross-sectional view of a hardened pump laser utilizing a hardened pump chamber, taken along line 2A-2A of FIG. 2C.

FIG. 2 (FIGS. 2A, 2B, and 2C) illustrates a cross-sectional diagram of a hardened pump laser 200 comprising a hardened pump chamber 210, and a solid-state laser rod 220. The hardened pump chamber 210 comprises a hardened filter tube 225, electrodes 230, 235, 270, 265, brazing caps 240, 245, 275, 280, and fill tube pump leads 250, 255, 285, 290. The ends of the hardened filter tube 225 are sealed with a sealing assembly formed of the brazing caps 240, 245, 275, 280.

Figure 1:
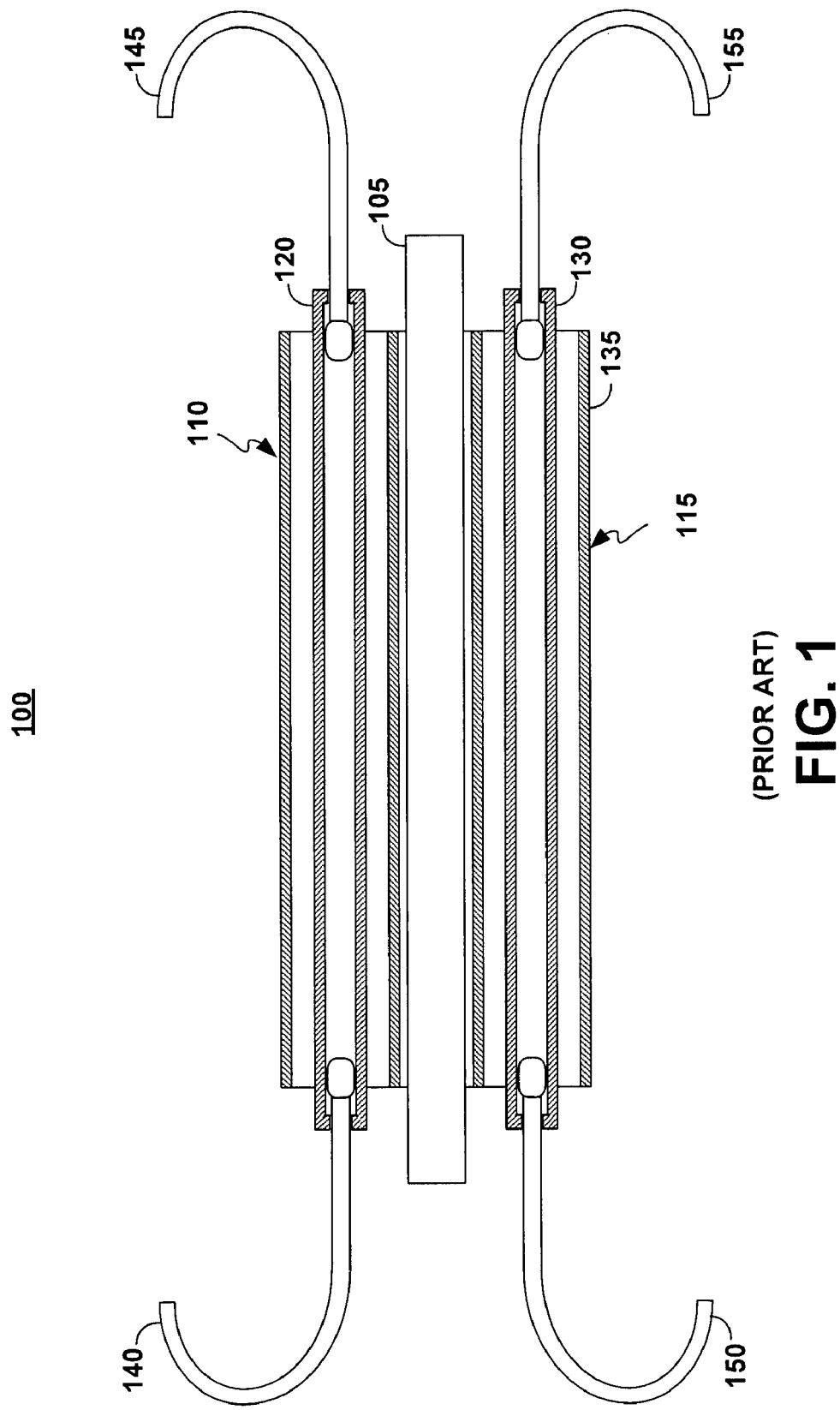
FIG. 1 is a cross-sectional view of a conventional solid-state flash lamp pumped laser.

The hardened filter tube 225, replaces the conventional flash lamps 120, 130, and the conventional laser cavity flow tubes 125, 135, shown in FIG. 1. The hardened pump chamber 210, generates light required to pump the solid-state laser rod 220 without requiring a fragile flash lamp or an additional laser cavity filter tube.

Figure 3:
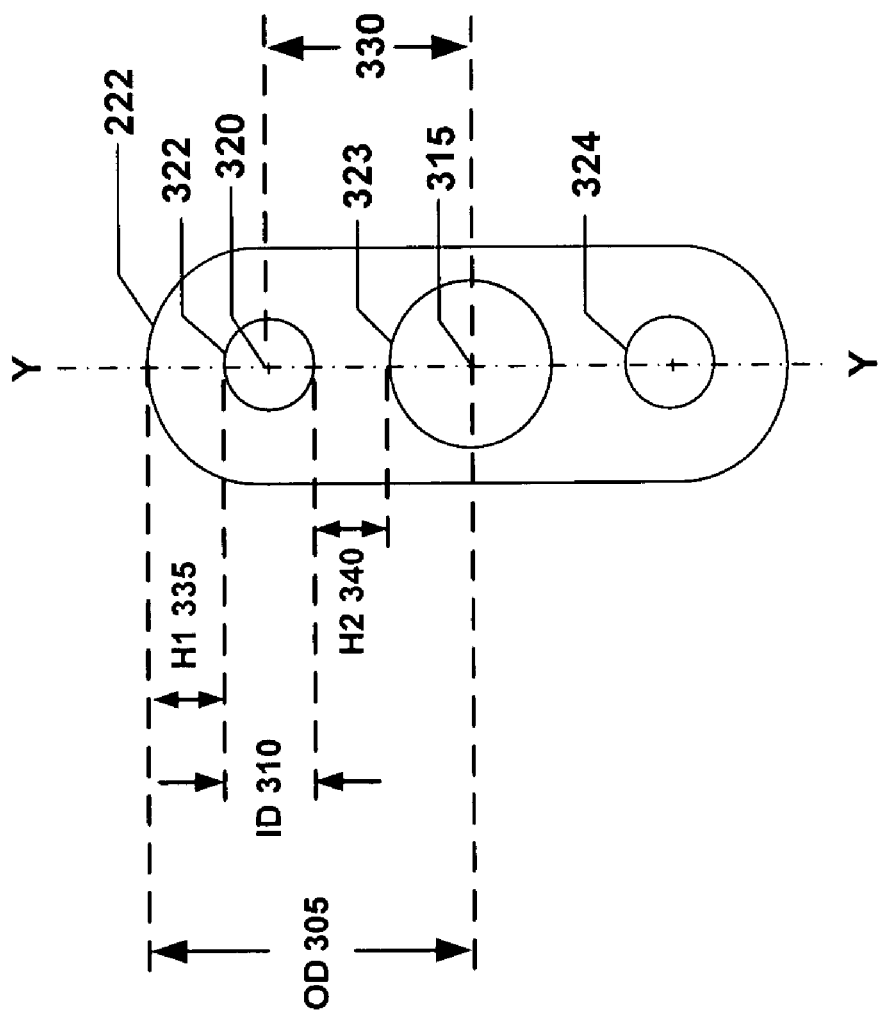
FIG. 3 is an enlarged rear view of a hardened filter tube forming part of the hardened pump laser of FIG. 2.

With further reference to FIG. 3, it illustrates the representative hardened filter tube 160 of the hardened pump chamber 215. The hardened filter tube 225 comprises hardened glass comprising light filtering characteristics that filter ultraviolet and infrared from the light generated by the hardened pump chambers 210.

The hardened filter tube 225 comprises an oval shaped body 222 that generally defines three internal chambers 322, 323, 324. Chambers 322, 323, 324 preferably have circular cross sections along their entire axial lengths. Chambers 322 and 324 are generally symmetrical relative to a geometric center 315 of the internal chamber 323 and thus only chamber 322 will be described herein in more detail. Chamber 322 is preferably smaller size than the internal chamber 323, and has a geometric center 320.

Body 222 is generally defined by an outer diameter, OD 305, of approximately 9.9 mm, relative to the geometric center 315 of chamber 323. Center 320 of chamber 322 is offset relative to center 315 of chamber 323, by a distance 330 of approximately 8.5 mm. Chamber 322 has an outer diameter ID 310 of approximately 3.7 mm. Chamber 322 is offset from body 222, by a distance H1 335 of approximately 3 mm, along axis YY. Chamber 323 is offset from chamber 322, by a distance H2 340 of approximately 3.1 mm, along axis YY.

The hardened filter tube 225 has an axial length of approximately 80 mm. Chamber 323 is the laser rod location. Chambers 322 and 324 are preferably filled with Xenon at approximately 600 Torr.

Figure 4:
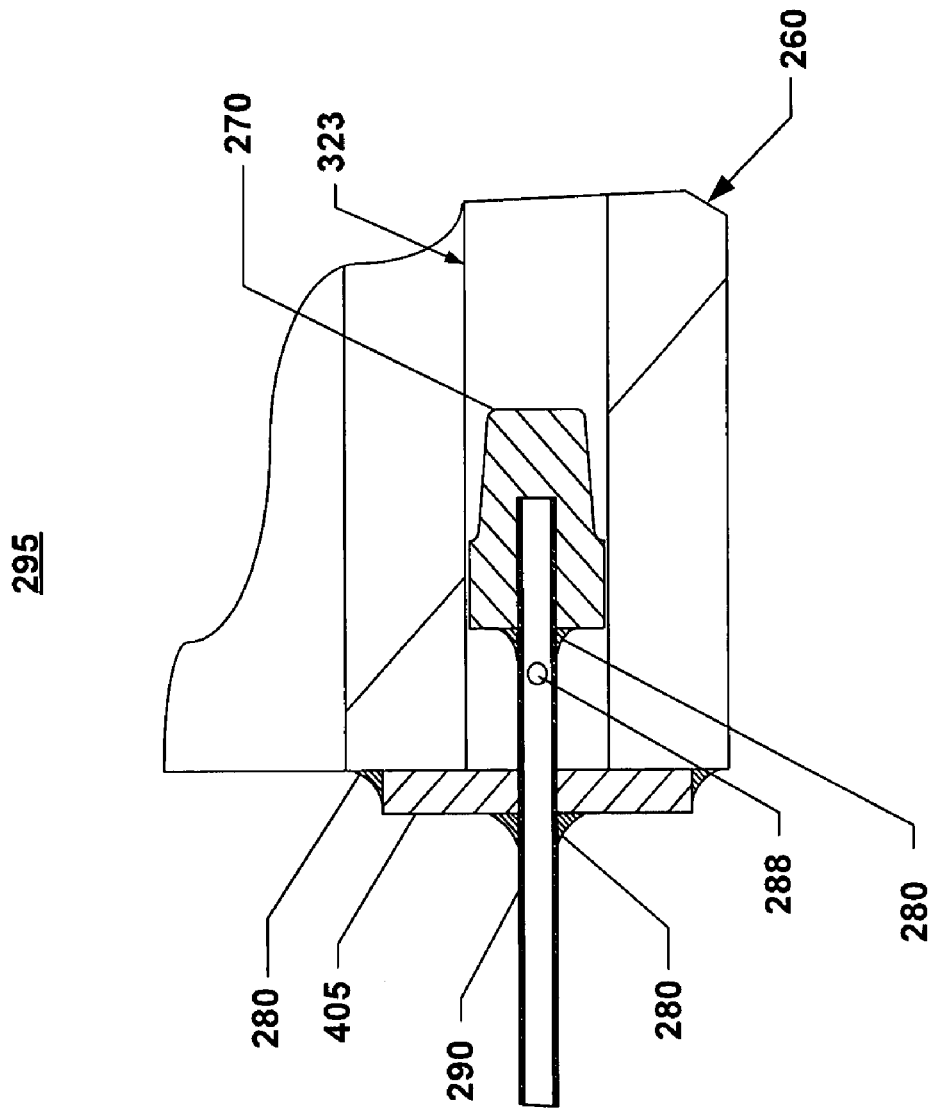
FIG. 4 is a greatly enlarged, cross-sectional view of a part of a hardened filter tube filling and sealing assembly forming part of the hardened pump chamber of FIG. 2, through which the hardened pump chamber is filled with gas.

FIG. 4 illustrates a detail of a cross-section of the filter tube filling and sealing assembly 295. The filter tube filling and sealing assembly 295 comprises a brazing cap 405 that seals chamber 323, and a plurality of braze joints 280. Braze joints 280 are preferably formed of a gold alloy braze and the brazing cap 405 is preferably formed of a hardened glass.

Chamber 323 is filled through electrode 270. Each of the electrodes 265 (FIG. 2) and 270 is approximately 1.4 mm in diameter and approximately 8.25 mm in length. Xenon gas is passed through a fill hole 288 in the fill tube 290, to fill chamber 323. Fill hole 288 has a diameter of approximately 0.5 mm. Fill tube 290 is brazed with a braze joints 280 with a 0.75 mm fillet to the electrode 270.

Figure 5:
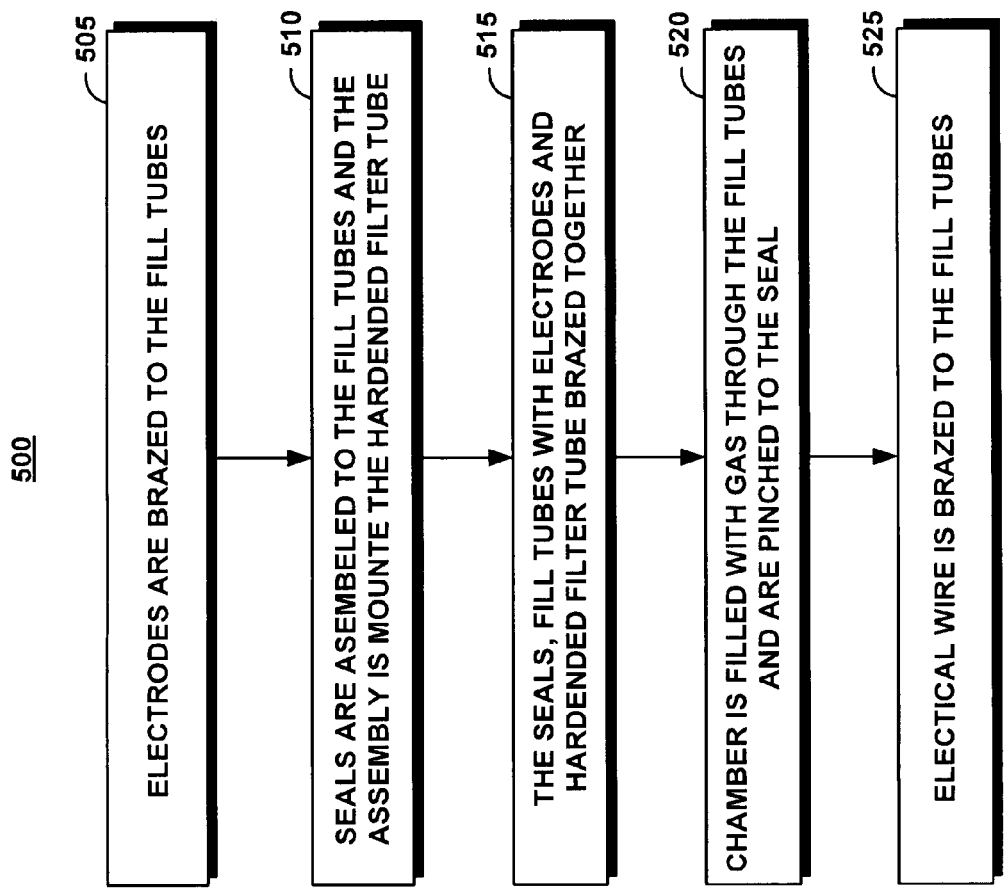
FIG. 5 is a process flow chart illustrating a method of fabricating the hardened pump chamber for the hardened pump laser of FIG. 2.

FIG. 5 illustrates a method 500 of making the hardened filter tube 225. The electrodes 265, 270, are braced to the hardened filter tube using a soft braze (step 505). The brazing caps 240, 245, 275, 280 are assembled to their respective fill tubes and the assembly is mounted into the hardened filter tube 225 (step 510). The brazing caps 240, 245, 275, 280, their fill tubes, including the electrodes and the hardened filter tube, 225 are pinched and sealed. Chamber 323 is filled with gas through one of the fill tubes which are pinched and sealed (step 520). An electrical wire is brazed to the fill tube (step 525), in order to pass electrical energy to the system to allow flashing.

It is to be understood that the specific embodiments of the invention that have been described are merely illustrative of certain applications of the principle of the present invention. Numerous modifications may be made to a hardened pump laser and method of manufacturing the same described herein without departing from the spirit and scope of the present invention.

What is claimed is:

1. A hardened pump laser, comprising:
a hardened pump chamber;
wherein the hardened pump chamber comprises a hardened filter tube, a plurality of electrodes, and a sealing assembly;
wherein the hardened filter tube includes ends that are sealed with the sealing assembly;
a laser rod; and
wherein the hardened pump chamber is filled through the electrodes with a Xenon gas at approximately 600 Torr, and is then sealed, so that the hardened pump chamber performs the laser pumping function while further performing filtering and diffusion functions.

* * * * *